United States Patent
Yamaguchi et al.

(10) Patent No.: US 9,780,410 B2
(45) Date of Patent: Oct. 3, 2017

(54) NONAQUEOUS LIQUID ELECTROLYTE

(71) Applicant: AISIN SEIKI KABUSHIKI KAISHA, Kariya-shi (JP)

(72) Inventors: Tsukasa Yamaguchi, Nagoya (JP); Takeshi Kamizono, Nagoya (JP); Gang Xie, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 115 days.

(21) Appl. No.: 14/530,088

(22) Filed: Oct. 31, 2014

(65) Prior Publication Data
US 2015/0270576 A1    Sep. 24, 2015

(30) Foreign Application Priority Data
Mar. 24, 2014   (JP) .................... 2014-059885

(51) Int. Cl.
*H01M 10/0567* (2010.01)
*H01M 10/0568* (2010.01)
*H01M 10/0569* (2010.01)
*H01M 10/054* (2010.01)

(52) U.S. Cl.
CPC ..... *H01M 10/0567* (2013.01); *H01M 10/054* (2013.01); *H01M 10/0568* (2013.01); *H01M 10/0569* (2013.01); *H01M 2300/0028* (2013.01)

(58) Field of Classification Search
CPC combination set(s) only.
See application file for complete search history.

(56) References Cited

U.S. PATENT DOCUMENTS

| | | | |
|---|---|---|---|
| 8,691,434 B2 | 4/2014 | Yamamoto et al. | |
| 2010/0136438 A1 | 6/2010 | Nakayama et al. | |
| 2011/0052998 A1* | 3/2011 | Liang | C01B 31/12 429/300 |
| 2011/0159381 A1* | 6/2011 | Doe | H01M 4/13 429/337 |
| 2013/0136982 A1 | 5/2013 | Kamizono et al. | |

FOREIGN PATENT DOCUMENTS

| | | |
|---|---|---|
| JP | 2009-21085 | 1/2009 |
| JP | 2009-64730 | 3/2009 |
| JP | 2013-115344 | 6/2013 |

* cited by examiner

*Primary Examiner* — Osei Amponsah
(74) *Attorney, Agent, or Firm* — Oblon, McClelland, Maier & Neustadt, L.L.P.

(57) ABSTRACT

A nonaqueous liquid electrolyte for an energy storage device that utilizes at least one of an oxidation reaction and a reduction reaction of magnesium, the nonaqueous liquid electrolyte includes an ether solvent, magnesium halide serving as an electrolyte, and aluminum halide serving as an additive, the magnesium halide and the aluminum halide being dissolved in the ether solvent.

3 Claims, 5 Drawing Sheets

Embodiment

Comparative example 1

Comparative example 2

Comparative example 3

Comparative example 4

Comparative example 5

Comparative example 6

NONAQUEOUS LIQUID ELECTROLYTE

CROSS REFERENCE TO RELATED APPLICATIONS

This application is based on and claims priority under 35 U.S.C. §119 to Japanese Patent Application 2014-059885, filed on Mar. 24, 2014, the entire content of which is incorporated herein by reference.

TECHNICAL FIELD

This disclosure generally relates to a nonaqueous liquid electrolyte for an energy storage device that utilizes at least one of an oxidation reaction and a reduction reaction of magnesium.

BACKGROUND DISCUSSION

A lithium secondary battery is known to include a large energy capacity and is thus utilized in various fields. Nevertheless, lithium is a scarce resource and is also expensive.

In addition, a magnesium secondary battery has been recently developed as an energy storage device that utilizes an oxidation-reduction reaction of magnesium. Magnesium is rich as a resource and is inexpensive. Therefore, the magnesium secondary battery is more expected as a future energy storage device than the lithium secondary battery.

A selection of nonaqueous liquid electrolyte used for the magnesium secondary battery affects a battery capability. Thus, a research regarding the nonaqueous liquid electrolyte for the magnesium secondary battery has been proceeded. JP2009-21085A which will be hereinafter referred to as Reference 1 discloses a nonaqueous liquid electrolyte for a magnesium secondary battery where magnesium chloride serving as an electrolyte and alkyl aluminum (dimethylaluminum chloride) serving as an additive are dissolved in tetrahydrofuran serving as a solvent. JP2009-64730A which will be hereinafter referred to as Reference 2 discloses a nonaqueous liquid electrolyte for a magnesium secondary battery where magnesium metal, halogenated hydrocarbon, aluminum halide, and quaternary ammonium salt are dissolved in an ether organic solvent.

In the nonaqueous liquid electrolyte disclosed in Reference 1, alkyl aluminum is used as the additive. In the nonaqueous liquid electrolyte disclosed in Reference 2, alkylmagnesium is generated by the reaction of magnesium metal and halogenated hydrocarbon in the solvent. Alkyl aluminum and alkylmagnesium generate a combustible gas by reacting with water, which leads to difficulty in handling. In addition, in the nonaqueous liquid electrolyte disclosed in each Reference 1 or 2, an oxidation-reduction current of magnesium is relatively small. Thus, in a case where the nonaqueous liquid electrolyte disclosed in each Reference 1 or 2 is used as an electrolyte for the magnesium secondary battery, it may be difficult to obtain a large output (i.e., voltage).

A need thus exists for a nonaqueous liquid electrolyte which is not susceptible to the drawback mentioned above.

SUMMARY

According to an aspect of this disclosure, a nonaqueous liquid electrolyte for an energy storage device that utilizes at least one of an oxidation reaction and a reduction reaction of magnesium, the nonaqueous liquid electrolyte includes an ether solvent, magnesium halide serving as an electrolyte, and aluminum halide serving as an additive, the magnesium halide and the aluminum halide being dissolved in the ether solvent.

According to another aspect of this disclosure, a method for producing a nonaqueous liquid electrolyte for an energy storage device that utilizes an oxidation-reduction reaction of magnesium, the method comprising a process for dissolving magnesium halide serving as an electrolyte and aluminum halide serving as an additive in an ether solvent.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
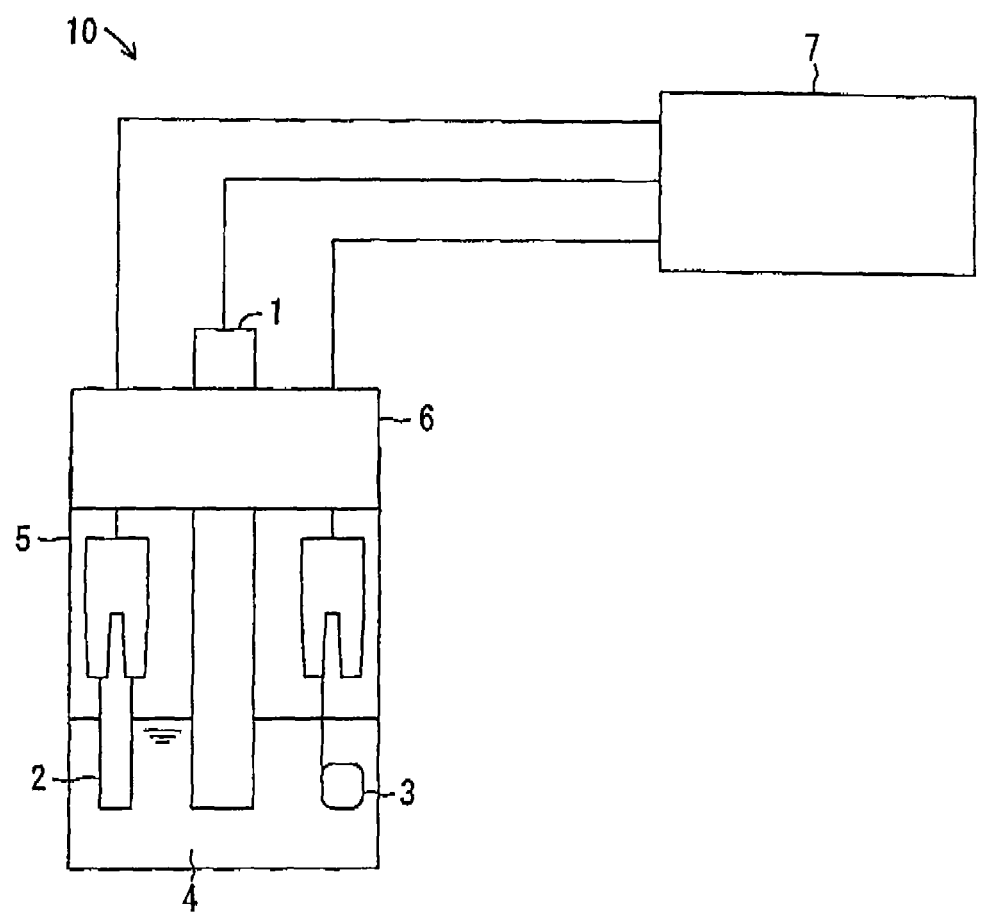
FIG. 1 is a diagram schematically illustrating a configuration of a three-electrode cell.
Figure 2:
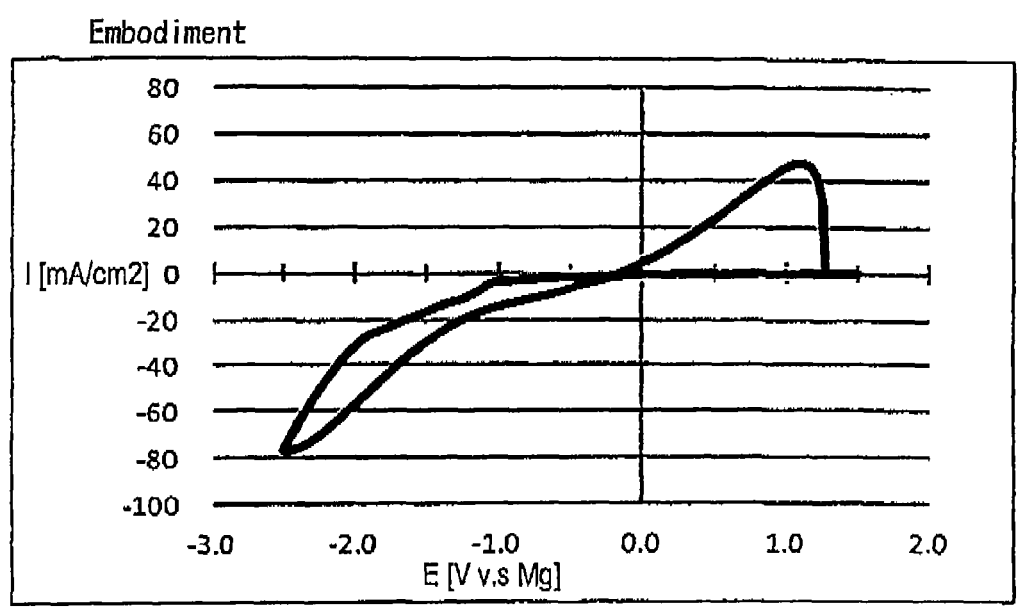
FIG. 2 is a graph illustrating a CV measurement result of a nonaqueous liquid electrolyte according to an embodiment.
Figure 3:
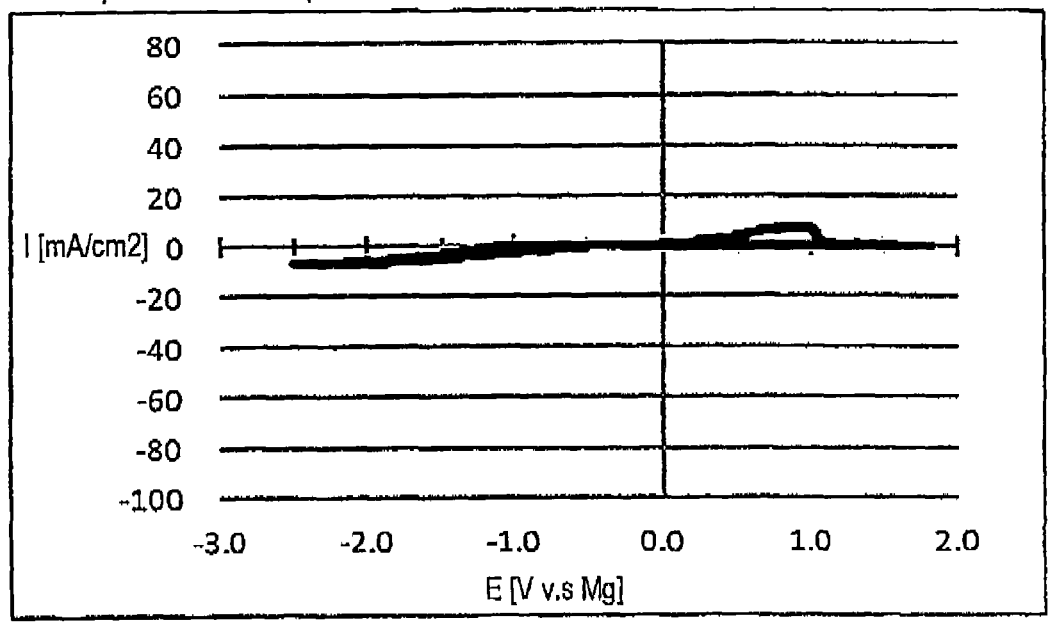
FIG. 3 is a graph illustrating a CV measurement result of a nonaqueous liquid electrolyte according to a comparative example 1.
Figure 4:
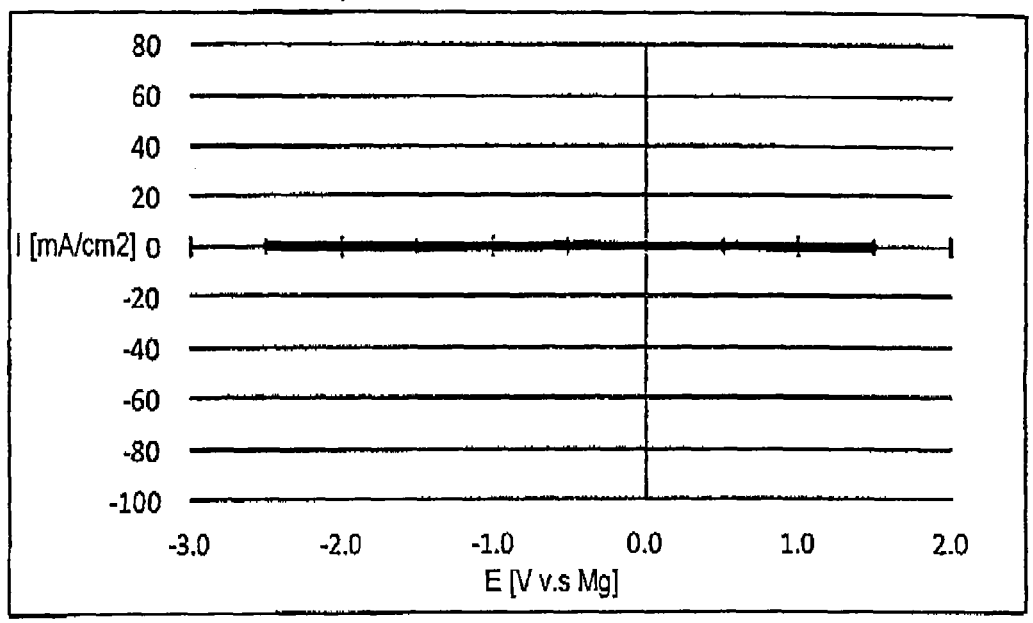
FIG. 4 is a graph illustrating a CV measurement result of a nonaqueous liquid electrolyte according to a comparative example 2.
Figure 5:
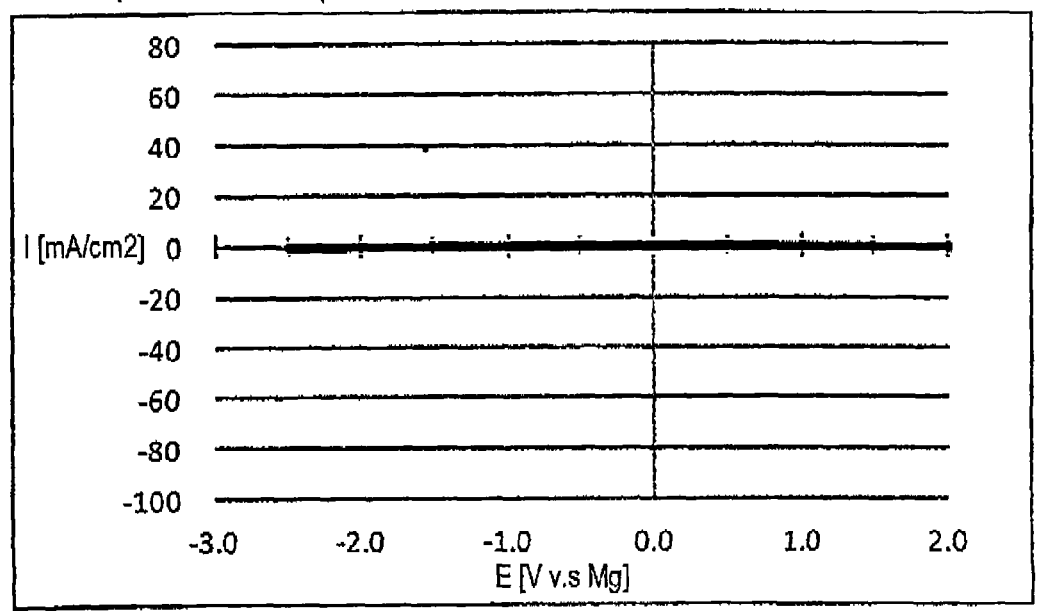
FIG. 5 is a graph illustrating a CV measurement result of a nonaqueous liquid electrolyte according to a comparative example 3.
Figure 6:
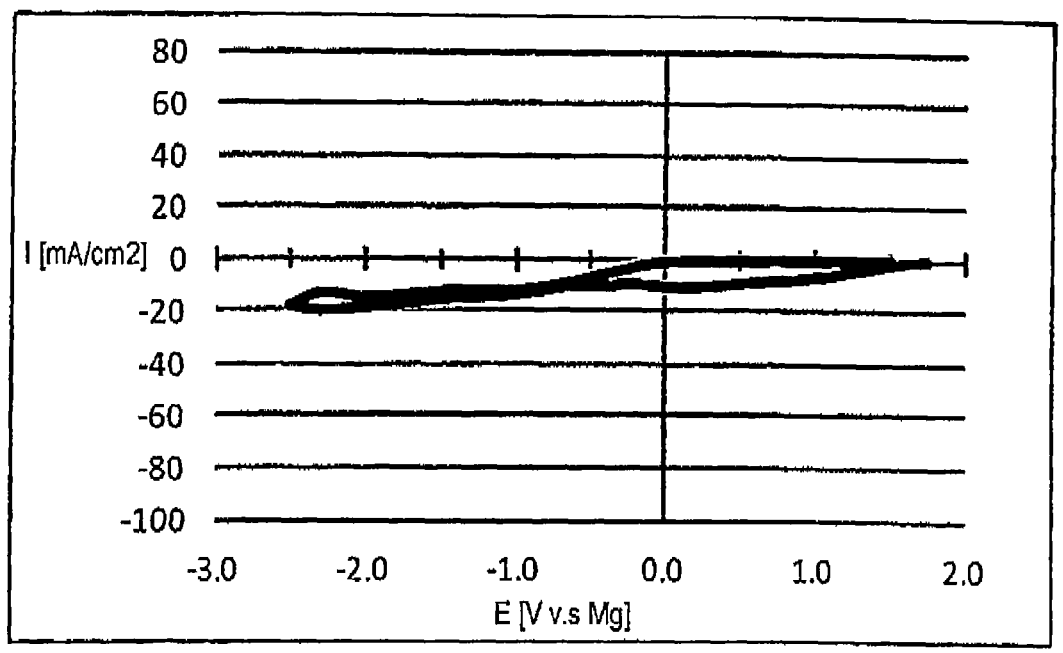
FIG. 6 is a graph illustrating a CV measurement result of a nonaqueous liquid electrolyte according to a comparative example 4.
Figure 7:
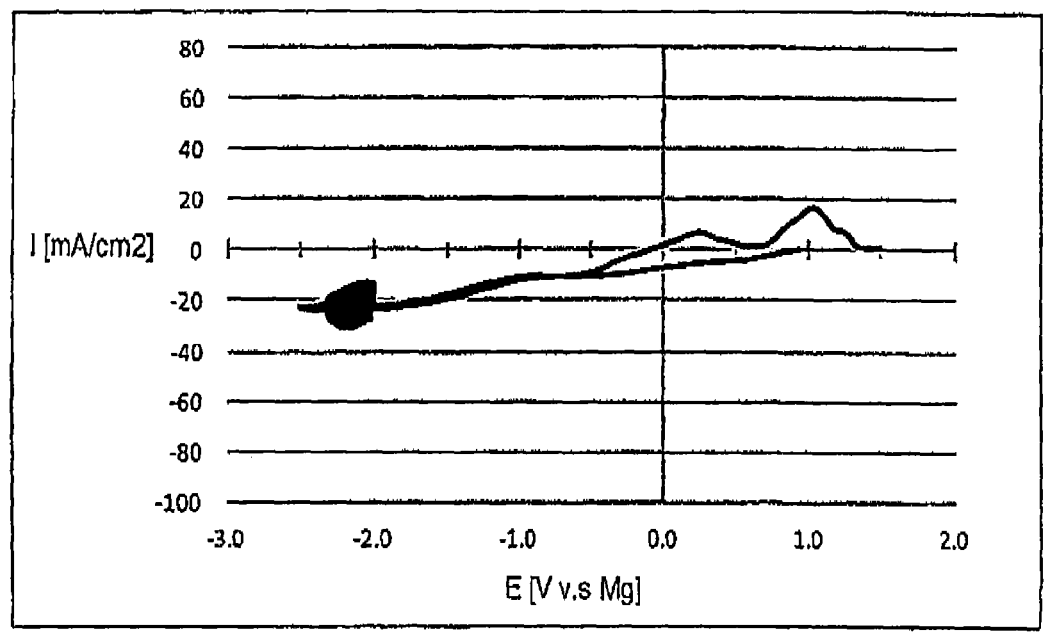
FIG. 7 is a graph illustrating a CV measurement result of a nonaqueous liquid electrolyte according to a comparative example 5.
Figure 8:
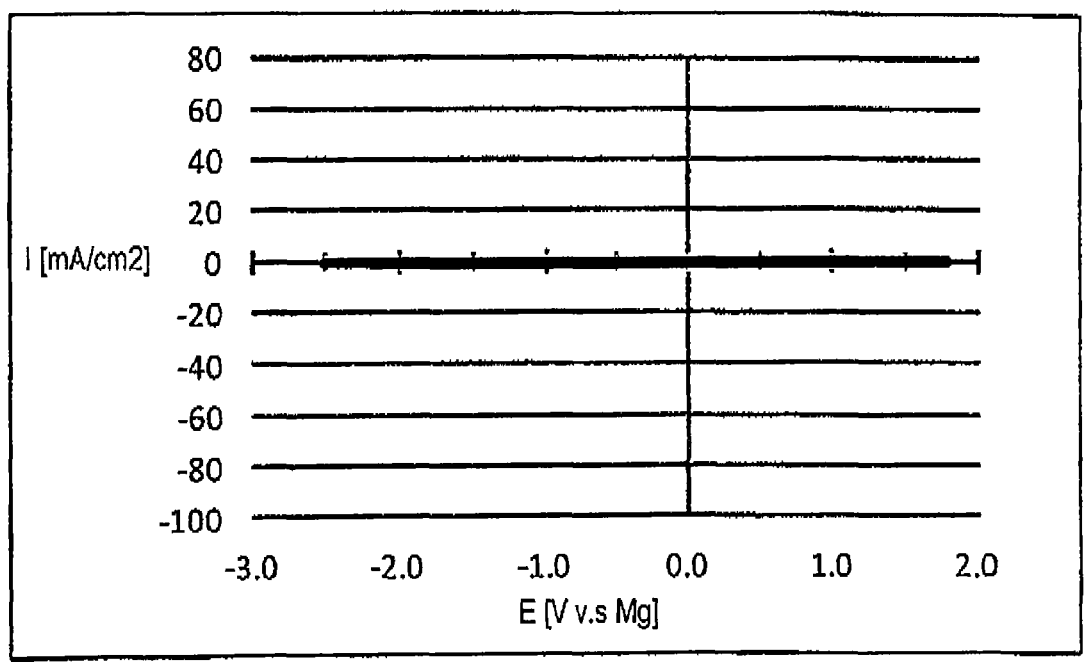
FIG. 8 is a graph illustrating a CV measurement result of a nonaqueous liquid electrolyte according to a comparative example 6.

A nonaqueous liquid electrolyte according to an embodiment is used, for example, for a magnesium (magnesium ion) secondary battery. The magnesium secondary battery basically includes a nonaqueous liquid electrolyte, a positive electrode and a negative electrode which are immersed, while keeping a distance therebetween, in the nonaqueous liquid electrolyte.

In a case where the magnesium secondary battery is discharged, magnesium ions are eluted into the nonaqueous liquid electrolyte from the negative electrode and electrons are emitted therefrom, which results in oxidation reaction at the negative electrode. Then, an electric energy is supplied to an external load provided between the negative electrode and the positive electrode by the electrons that are emitted from the negative electrode. The magnesium ions eluted into the nonaqueous liquid electrolyte move through the nonaqueous liquid electrolyte to reach the positive electrode, The magnesium ions are considered to form complex ions in the nonaqueous liquid electrolyte by solvent molecules, for example, which are coordinated to the magnesium ions. At the positive electrode, the magnesium ions are absorbed by a positive electrode active material. In addition, elements constituting the positive electrode active material absorb the electrons from the external load, which results in reduction reaction at the positive electrode.

On the other hand, in a case where the magnesium secondary battery is charged, the magnesium ions absorbed by the positive electrode active material and the magnesium ions in the nonaqueous liquid electrolyte are pulled to the negative electrode, which results in reduction of ions (reduction reaction) at the negative electrode. Accordingly, magnesium metal is deposited at the negative electrode. An energy storage device in which the nonaqueous liquid electrolyte according to the embodiment is applied utilizes an oxidation-reduction reaction of magnesium.

The nonaqueous liquid electrolyte in the embodiment at least includes an ether solvent, an electrolyte, and an additive. 2-methyltetrahydrofuran (which will be hereinafter referred to as 2Me-THF) is desirably used as the ether solvent. The electrolyte is magnesium halide. Specifically, chlorine is desirably used as halogen. Therefore, magnesium chloride ($MgCl_2$) is desirable as the electrolyte. The additive is aluminum halide. Specifically, chlorine is desirably used as halogen. Therefore, aluminum chloride ($AlCl_3$) is desirable as the additive. At this time, magnesium chloride is a compound constituted by bonding of a magnesium ion to two elemental chloride ions. In addition, aluminum chloride is a compound constituted by bonding of an aluminum ion to three elemental chloride ions.

The nonaqueous liquid electrolyte in the embodiment is produced in a state where magnesium halide serving as the electrolyte and aluminum halide serving as the additive are dissolved in the ether solution. Specifically, $MgCl_2$ in a solid powder form (i.e., $MgCl_2$ powder) serving as the electrolyte and $AlCl_3$ in a solid powder form (i.e., $AlCl_3$ powder) serving as the additive are dissolved in 2Me-THF serving as the solvent (i.e., 2Me-THF solvent) to produce the nonaqueous liquid electrolyte.

In this case, first, a container is prepared. $MgCl_2$ powder and $AlCl_3$ powder are put into the container to which 2Me-THF solvent is then added. $MgCl_2$ powder only is not dissolved in 2Me-THF solvent. Addition of $AlCl_3$ powder to $MgCl_2$ powder achieves dissolution thereof in 2Me-THF solvent. In order to enhance the dissolution of the aforementioned powders, the solvent may be heated or oscillated.

In the nonaqueous liquid electrolyte produced in the aforementioned manner, an oxidation-reduction current of magnesium (Mg) is high. The reason why the oxidation-reduction current of Mg is high is unclear, however, it is assumed as below. That is, by putting $MgCl_2$ powder into 2Me-THF solvent to which $AlCl_3$ powder is thereafter added, chlorine (Cl) in $MgCl_2$ is extracted by $AlCl_3$ so that $MgCl^-$ ions are liberated. $MgCl^-$ ions which are liberated form complexes, together with solvent molecules (2Me-THF) or chloride ions. A bonding force of the aforementioned complexes is not strong or weak. Such bonding force will be referred to as a mild bonding of the complexes in the disclosure. Because of the mild bonding of the complexes, Mg as a core of the complexes is easily oxidized and reduced, which enhances the oxidation-reduction reaction of Mg. Thus, it is assumed that the oxidation-reduction current of Mg is high.

2Me-THF (manufactured by Tokyo Chemical Industry Co., Ltd.) serving as the solvent, $MgCl_2$ powder (manufactured by Kishida Chemical Co., Ltd.) serving as the electrolyte, and $AlCl_3$ powder (manufactured by Strem Chemicals, Inc.) serving as the additive were prepared. Then, a liquid mixture in which the $MgCl_2$ powder and the $AlCl_3$ powder were mixed in the 2Me-THF solvent was obtained in a glove box so that the concentration of each of the $MgCl_2$ powder and the $AlCl_3$ powder in the 2Me-THF solvent was equal to 0.5 mol/L. The aforementioned liquid mixture was heated to 60° C. and applied with supersonic vibration so that the $MgCl_2$ powder and the $AlCl_3$ powder were uniformly dissolved in the 2Me-THF solvent. As a result, the nonaqueous liquid electrolyte according to the embodiment was produced.

Tetrahydrofuran (THF: manufactured by Tokyo Chemical Industry Co., Ltd.) serving as the solvent, $MgCl_2$ powder (manufactured by Kishida Chemical CO., Ltd.) serving as the electrolyte, and dimethylaluminum chloride (($CH_3$)$_2AlCl$) powder (manufactured by Sigma-Aldrich) were prepared. Then, a liquid mixture in which the $MgCl_2$ powder and the $(CH_3)_2AlCl$ powder were mixed in the THF solvent was obtained in a glove box so that the concentration of each of the $MgCl_2$ powder and the $(CH_3)_2AlCl$ powder in the THF solvent was equal to 0.5 mol/L. Next, the aforementioned liquid mixture was heated to 60° C. and applied with supersonic vibration so that the $MgCl_2$ powder and the $(CH_3)_2AlCl$ powder were uniformly dissolved in the THF solvent. As a result, the nonaqueous liquid electrolyte according to a comparative example 1 was produced.

2Me-THF (manufactured by Tokyo Chemical Industry Co., Ltd.) serving as the solvent, magnesium perchlorate ($Mg(ClO_4)_2$) powder (manufactured by Kishida Chemical Co., Ltd.) serving as the electrolyte, and aluminum perchlorate ($Al(ClO_4)_3$) powder (manufactured by Sigma-Aldrich) serving as the additive were prepared. Then, a liquid mixture in which the $Mg(ClO_4)_2$ powder and the $Al(ClO_4)_3$ powder were mixed in the 2Me-THF solvent was obtained in a glove box so that the concentration of each of the $Mg(ClO_4)_2$ powder and the $Al(ClO_4)_3$ powder was equal to 0.5 mol/L. Next, the aforementioned liquid mixture was heated to 60° C. and applied with supersonic vibration so that the $Mg(ClO_4)_2$ powder and the $Al(ClO_4)_3$ powder were uniformly dissolved in the 2Me-THF solvent. As a result, the nonaqueous liquid electrolyte according to a comparative example 2 was produced.

γ-butyrolactone ($C_4H_6O_2$: GBL) (manufactured by Kishida Chemical Co., Ltd.) serving as the solvent, magnesium perchlorate ($Mg(ClO_4)_2$) powder (manufactured by Kishida Chemical Co., Ltd.) serving as the electrolyte, and aluminum perchlorate ($Al(ClO_4)_3$) powder (manufactured by Sigma-Aldrich) serving as the additive were prepared. Then, a liquid mixture in which the $Mg(ClO_4)_2$ powder and the $Al(ClO_4)_3$ powder were mixed in the GBL solvent was obtained in a glove box so that the concentration of each of the $Mg(ClO_4)_2$ powder and the $Al(ClO_4)_3$ powder was equal to 0.5 mol/L. Next, the aforementioned liquid mixture was heated to 60° C. and applied with supersonic vibration so that the $Mg(ClO_4)_2$ powder and the $Al(ClO_4)_3$ powder were uniformly dissolved in the GBL solvent. As a result, the nonaqueous liquid electrolyte according to a comparative example 3 was produced.

2Me-THF (manufactured by Tokyo Chemical Industry Co., Ltd.) serving as the solvent, magnesium perchlorate ($Mg(ClO_4)_2$) powder (manufactured by Kishida Chemical Co., Ltd.) serving as the electrolyte, and $AlCl_3$ powder (manufactured by Strem Chemicals, Inc.) serving as the additive were prepared. Then, a liquid mixture in which the $Mg(ClO_4)_2$ powder and the $AlCl_3$ powder were mixed in the 2Me-THF solvent was obtained in a glove box so that the concentration of each of the $Mg(ClO_4)_2$ powder and the $AlCl_3$ powder was equal to 0.5 mol/L. Next, the aforementioned liquid mixture was heated to 60° C. and applied with supersonic vibration so that the $Mg(ClO_4)_2$ powder and the $AlCl_3$ powder were uniformly dissolved in the 2Me-THF solvent. As a result, the nonaqueous liquid electrolyte according to a comparative example 4 was produced.

2Me-THF (manufactured by Tokyo Chemical Industry Co., Ltd.) serving as the solvent, $MgCl_2$ powder (manufactured by Kishida Chemical Co., Ltd.) serving as the electrolyte, and ferric chloride (III) ($FeCl_3$) powder (manufactured by Wako Pure Chemical Industries, Ltd.) serving as the additive were prepared. Then, a liquid mixture in which the $MgCl_2$ powder and the $FeCl_3$ powder were mixed in the 2Me-THF solvent was obtained in a glove box so that the concentration of each of the $MgCl_2$ powder and the $FeCl_3$ powder in the 2Me-THF solvent was equal to 0.5 mol/L. Next, the aforementioned liquid mixture was heated to 60° C. and applied with supersonic vibration so that the $MgCl_2$ powder and the $FeCl_3$ powder were uniformly dissolved in the 2Me-THF solvent. As a result, the nonaqueous liquid electrolyte according to a comparative example 5 was produced.

GBL (manufactured by Kishida Chemical Co., Ltd.) serving as the solvent, $MgCl_2$ powder (manufactured by Kishida Chemical Co., Ltd.) serving as the electrolyte, and $AlCl_3$ powder (manufactured by Strem Chemicals, Inc.) serving as the additive were prepared. Then, a liquid mixture in which the $MgCl_2$ powder and the $AlCl_3$ powder were mixed in the GBL solvent was obtained in a glove box so that the concentration of each of the $MgCl_2$ powder and the $AlCl_3$ powder was equal to 0.5 mol/L. Next, the aforementioned liquid mixture was heated to 60° C. and applied with supersonic vibration so that the $MgCl_2$ powder and the $AlCl_3$ powder were uniformly dissolved in the GBL solvent. As a result, the nonaqueous liquid electrolyte according to a comparative example 6 was produced.

A cyclic voltammetry (CV) measurement was performed on the nonaqueous liquid electrolyte according to the embodiment, and on the nonaqueous liquid electrolyte according to each of the comparative examples 1 to 6. At this time, a three-electrode cell including a platinum working electrode, a platinum counter electrode, and a magnesium reference electrode was used for the CV measurement.

As illustrated in FIG. 1, a three-electrode cell 10 includes a platinum working electrode 1, a magnesium reference electrode 2, a platinum counter electrode 3, a cylindrical container 5, a silicon cap 6, and a potentiostat 7. A nonaqueous liquid electrolyte 4 is filled in the cylindrical container 5. The platinum working electrode 1, the magnesium reference electrode 2, and the platinum counter electrode 3 are immersed, while being placed at intervals, in the nonaqueous liquid electrolyte 4. The platinum working electrode 1, the magnesium reference electrode 2, and the platinum counter electrode 3 are electrically connected to the potentiostat 7. An opening of the cylindrical container 5 is sealed by the silicon cap 6.

The nonaqueous liquid electrolyte (the nonaqueous liquid electrolyte 4) according to each of the embodiment and the comparative examples 1 to 6 was filled in the cylindrical container 5 of the three-electrode cell 10 including the aforementioned configuration and then the potentiostat 7 was operated to apply a voltage between the platinum working electrode 1 and the magnesium reference electrode 2. The applied voltage was changed in the following order of an open circuit voltage (OCV), a negative potential (the potential at the reference electrode 2 is smaller than the potential of the working electrode 1), a positive potential (the potential at the reference electrode 2 is greater than the potential of the working electrode 1), and the open circuit voltage (OCV) so as to measure an electric current flowing through between the platinum working electrode 1 and the platinum counter electrode 3. In this case, a scan speed of voltage was specified to be 5 mV/sec.

A table 1 below indicates details of the nonaqueous liquid electrolyte, the additive, the solvent used in each of the embodiment and the comparative examples, and a peak value (a maximum value) of an oxidation current and a peak value (a maximum value) of a reduction current obtained from CV measurement results.

TABLE 1

| | Electrolyte | | | Additive | | Oxidation current peak value [mA/cm$^2$] | Reduction current peak value [mA/cm$^2$] |
|---|---|---|---|---|---|---|---|
| | Compounds | Content [mol/L] | Solvent | Compounds | Content [mol/L] | | |
| Embodiment | $MgCl_2$ | 0.5 | 2Me—THF | $AlCl_3$ | 0.5 | 47 | 76 |
| Comparative example 1 | $MgCl_2$ | 0.5 | THF | $(CH_3)_2AlCl$ | 0.5 | 7.3 | 7.2 |
| Comparative example 2 | $Mg(ClO_4)_2$ | 0.5 | 2Me—THF | $Al(ClO_4)_3$ | 0.5 | 0 | 0.35 |
| Comparative example 3 | $Mg(ClO_4)_2$ | 0.5 | GBL | $Al(ClO_4)_3$ | 0.5 | 0 | 1.6 |
| Comparative example 4 | $Mg(ClO_4)_2$ | 0.5 | 2Me—THF | $AlCl_3$ | 0.5 | 0 | 20 |
| Comparative example 5 | $MgCl_2$ | 0.5 | 2Me—THF | $FeCl_3$ | 0.5 | 16 | 34 |
| Comparative example 6 | $MgCl_2$ | 0.5 | GBL | $AlCl_3$ | 0.5 | 0 | 0.85 |

As indicated in Table 1 and FIGS. 2 to 8, the oxidation current peak value and the reduction current peak value of the nonaqueous liquid electrolyte according to the embodiment are higher than those according to the comparative examples 1 to 6. Thus, it is understood that the nonaqueous liquid electrolyte according to the embodiment is effective for the energy storage device that utilizes the oxidation-reduction reaction of magnesium.

As understood in a comparison between the embodiment and the comparative example 1, the oxidation current peak value and the reduction current peak value of the nonaqueous liquid electrolyte are higher in a case where the additive is aluminum chloride ($AlCl_3$) as in the embodiment than in a case where the additive is alkyl aluminum (($CH_3)_2AlCl$) as in the comparative example 1. As a result, it is found that aluminum chloride is desirable as the additive.

As understood in a comparison between the embodiment and the comparative example 2, the oxidation current peak value and the reduction current peak value of the nonaqueous liquid electrolyte are higher in a case where the additive is aluminum chloride ($AlCl_3$) as in the embodiment than in a case where the additive is aluminum perchlorate ($Al(ClO_4)_3$) as in the comparative example 2. As a result, the additive should be a compound where an aluminum ion is bonded to more than two elemental chloride ions. As in the comparative example 2, in a case where the compound in which aluminum ions are bonded to perchlorate ions is used as the additive, the oxidation current peak value and the reduction current peak value of the nonaqueous liquid electrolyte are extremely low.

As understood in a comparison between the embodiment and the comparison example 3 and between the embodiment and the comparison example 6, the oxidation current peak value and the reduction current peak value of the nonaqueous liquid electrolyte are higher in a case where the solvent is 2Me-THF as in the embodiment than in a case where the solvent is GBL as in the comparison examples 3 and 6. As a result, the solvent should be an ether solvent and, a usage of esters solvent as in the comparative examples 3 and 6 causes low oxidation current peak value and reduction current peak value of the nonaqueous liquid electrolyte. 2Me-THF is appropriate for the ether solvent.

As understood in a comparison between the embodiment and the comparative example 4, the oxidation current peak value and the reduction current peak value of the nonaqueous liquid electrolyte are higher in a case where the electrolyte is magnesium chloride ($MgCl_2$) as in the embodiment than in a case where the electrolyte is magnesium perchlorate ($Mg(ClO_4)_2$) as in the comparative example 4. As a result, the electrolyte should be a compound in which magnesium ions are bonded to elementary chloride ions. As in the comparative example 4, in a case where the compound in which magnesium ions are bonded to perchlorate ions is used as the additive, the oxidation current peak value and the reduction current peak value of the nonaqueous liquid electrolyte are low.

In addition, as understood in a comparison between the embodiment and the comparative example 5, the oxidation current peak value and the reduction current peak value of the nonaqueous liquid electrolyte are higher in a case where the additive is aluminum chloride ($AlCl_3$) as in the embodiment than in a case where the additive is ferric chloride (III) ($FeCl_3$) as in the comparative example 5. Accordingly, metal contained in the additive should be aluminum and other metal than aluminum causes relatively low oxidation current peak value and reduction current peak value of the nonaqueous liquid electrolyte.

Accordingly, the nonaqueous liquid electrolyte of the embodiment includes an ether solvent serving as the solvent, magnesium halide serving as the electrolyte and aluminum halide serving as the additive in a state where magnesium halide and aluminum halide are dissolved in the ether solvent. A method for producing the nonaqueous liquid electrolyte of the embodiment includes a process for dissolving magnesium halide serving as the electrolyte and aluminum halide serving as the additive in the ether solvent serving as the solvent.

Magnesium halide serving as the electrolyte is magnesium chloride ($MgCl_2$) and aluminum halide serving as the additive is aluminum chloride ($AlCl_3$). In addition, the ether solvent is 2-methyltetrahydrofuran (2Me-THF).

The nonaqueous liquid electrolyte according to the embodiment achieves a high oxidation-reduction current value as explained above. In addition, because the nonaqueous liquid electrolyte according to the embodiment is inhibited from including or utilizing alkyl aluminum or alkylmagnesium, handling of the nonaqueous liquid electrolyte may be easy. Thus, the nonaqueous liquid electrolyte for the energy storage device that utilizes at least one of the oxidation reaction and the reduction reaction of magnesium is useful.

According to the nonaqueous liquid electrolyte of the embodiment, the nonaqueous liquid electrolyte according to the embodiment is inhibited from utilizing alkyl aluminum or alkylmagnesium, which results in an easy handling of the nonaqueous liquid electrode. In addition, the oxidation-reduction current value of the nonaqueous liquid electrolyte in the embodiment is greater than that of a known magnesium secondary battery.

In the embodiment, the magnesium halide is magnesium chloride ($MgCl_2$).

In addition, in the embodiment, the aluminum halide is aluminum chloride ($AlCl_3$).

Further, the ether solvent is 2-methyltetrahydrofuran.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A nonaqueous liquid electrolyte, consisting of:
    an ether solvent, which is 2-methyltetrahydrofuran;
    magnesium chloride ($MgCl_2$) serving as an electrolyte; and
    aluminum chloride ($AlCl_3$) serving as an additive,
    the magnesium chloride ($MgCl_2$) and the aluminum chloride ($AlCl_3$) being dissolved in 2-methyltetrahydrofuran,
    wherein a content ratio of the magnesium chloride ($MgCl_2$) to the aluminum chloride ($AlCl_3$) is 1:1.

2. A method for producing a nonaqueous liquid electrolyte according to claim 1, the method comprising dissolving magnesium chloride ($MgCl_2$) serving as an electrolyte and aluminum chloride ($AlCl_3$) serving as an additive in 2-methyltetrahydrofuran.

3. The nonaqueous liquid electrolyte according to claim 1, wherein a content of the magnesium chloride ($MgCl_2$) is 0.5 mol/L and a content of the aluminum chloride ($AlCl_3$) is 0.5 mol/L, based on 1 L of the ether solvent.

* * * * *